United States Patent
Rothschild

(10) Patent No.: US 9,547,667 B2
(45) Date of Patent: Jan. 17, 2017

(54) IMAGE ANNOTATION FOR IMAGE AUXILIARY INFORMATION STORAGE AND RETRIEVAL

(76) Inventor: Leigh M. Rothschild, Sunny Isles Beach, FL (US)

(*) Notice: Subject to any disclaimer, the term of this patent is extended or adjusted under 35 U.S.C. 154(b) by 125 days.

(21) Appl. No.: 12/860,404

(22) Filed: Aug. 20, 2010

(65) Prior Publication Data

US 2012/0047424 A1 Feb. 23, 2012

(51) Int. Cl.
G06F 17/20 (2006.01)
G06F 17/30 (2006.01)

(52) U.S. Cl.
CPC ............... *G06F 17/30268* (2013.01)

(58) Field of Classification Search
CPC ............................................. G06F 17/30265
USPC ......................... 715/209, 230; 707/3, 6
See application file for complete search history.

(56) References Cited

U.S. PATENT DOCUMENTS

| | | | | |
|---|---|---|---|---|
| 7,231,594 B1* | 6/2007 | Hitchcock et al. | ........... | 715/229 |
| 7,546,524 B1* | 6/2009 | Bryar et al. | ........... | 715/230 |
| 7,577,901 B1* | 8/2009 | Hull et al. | ........... | 715/230 |
| 7,826,074 B1* | 11/2010 | Wang et al. | ........... | 358/1.13 |
| 2005/0081135 A1* | 4/2005 | Kindberg et al. | ........... | 715/500 |
| 2005/0243369 A1* | 11/2005 | Goldstein et al. | ........... | 358/1.18 |
| 2007/0276808 A1* | 11/2007 | McGushion | ........... | 707/3 |
| 2009/0150147 A1* | 6/2009 | Jacoby | ........... | G06F 17/30265 704/235 |
| 2009/0307232 A1* | 12/2009 | Hall | ........... | 707/10 |
| 2010/0034468 A1* | 2/2010 | Boncyk | ........... | G06F 17/30247 382/217 |
| 2011/0010631 A1* | 1/2011 | Rothschild | ........... | 715/733 |
| 2011/0016378 A1* | 1/2011 | Rothschild | ........... | 715/205 |

OTHER PUBLICATIONS

Online barcode Generator (http://barcode.tec-it.com/ verified Aug. 10, 2010).*
WebStickers: Using Physical Tokens to Access, Manage and Share Bookmarks to the Web by Peter Ljungstrand.*

* cited by examiner

*Primary Examiner* — William Bashore
*Assistant Examiner* — Nathan Shrewsbury
(74) *Attorney, Agent, or Firm* — Eugenio J. Torres-Oyola; Victor Rodriguez-Reyes; Rafael Rodriguez-Muriel

(57) ABSTRACT

Embodiments of the present invention provide a novel and non-obvious method, system and computer program product for image annotation for image auxiliary information storage and retrieval. In an embodiment of the invention, a method for image annotation for image auxiliary information storage and retrieval is provided. The method includes loading a digital image into memory of a computer and selecting separately stored auxiliary information for the digital image. A network location of the auxiliary information can be encoded. Finally, the encoding can be embedded into the digital image.

9 Claims, 2 Drawing Sheets

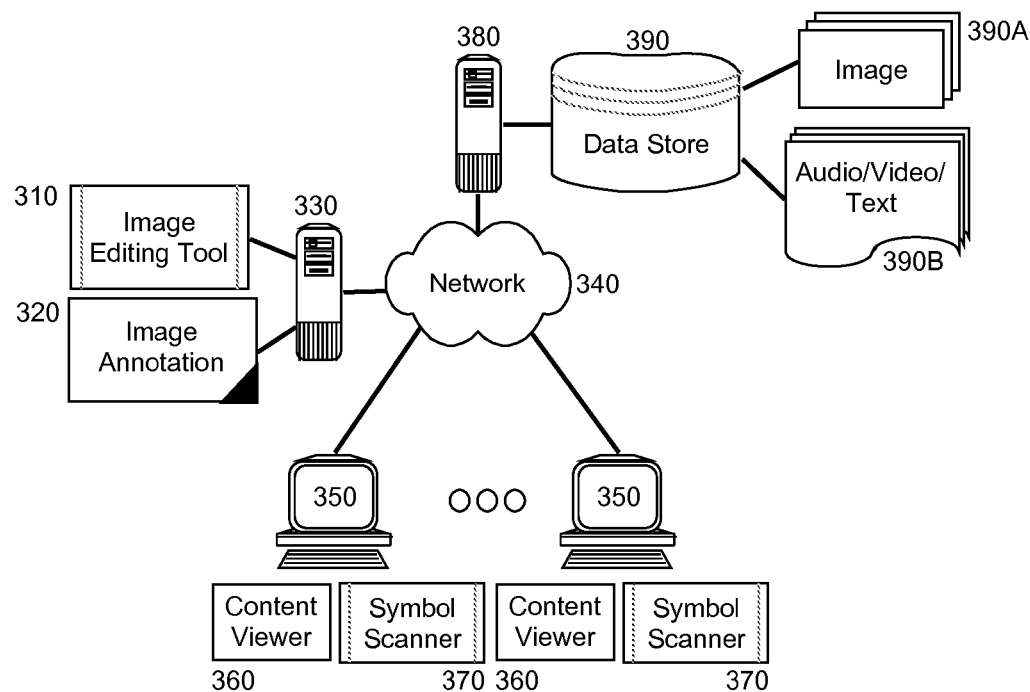
FIG. 3
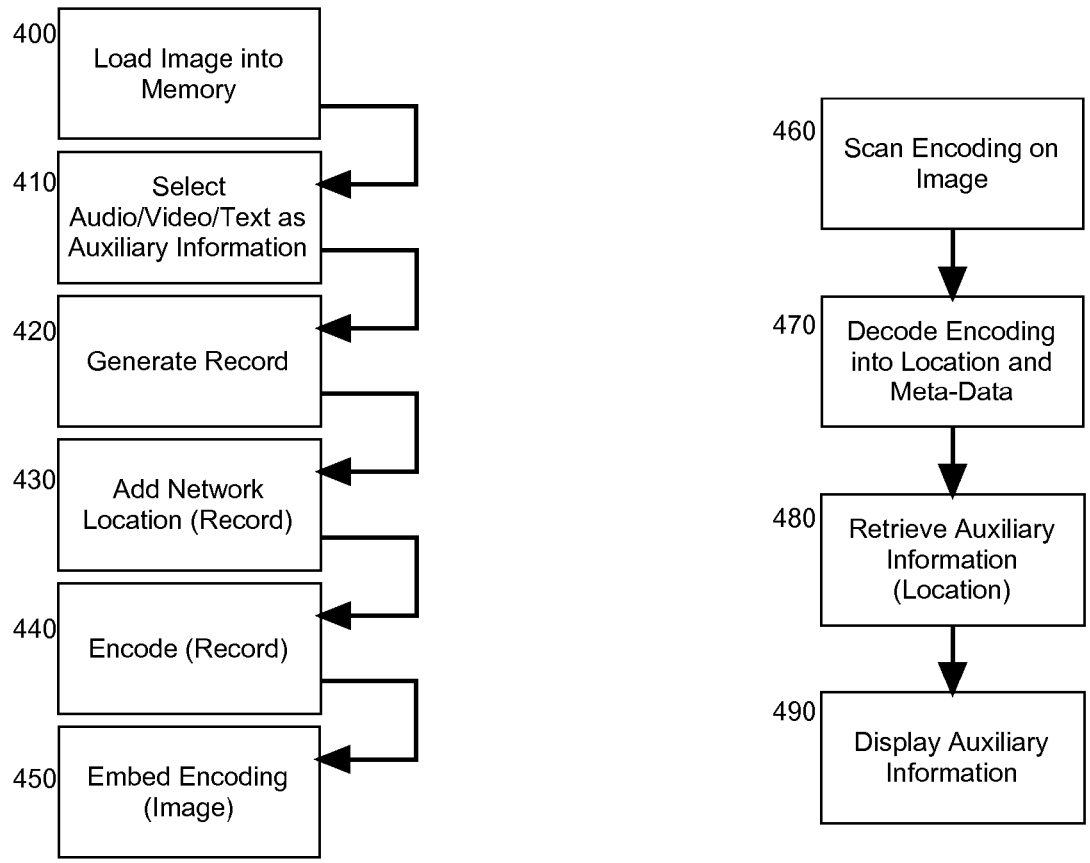

IMAGE ANNOTATION FOR IMAGE AUXILIARY INFORMATION STORAGE AND RETRIEVAL

BACKGROUND OF THE INVENTION

Field of the Invention

The present invention relates to computerized image storage and retrieval and more particularly to image file meta-data management.

Description of the Related Art

Photography has progressed from a service available only through the efforts of a skilled professional photographer to a hobbyist pursuit. The advent of the digital camera has enabled all comers to enjoy the benefit of photography without engaging in the burdensome film development process requiring a substantial lag in time between the capturing of a photographic image and the viewing of the image in print. Recent developments in digital photography has allowed ordinary consumers to enjoy access to cameras of a power previously only known to professional photographers. Further, advancements in memory technology now permit the capturing of hundreds of images in one sitting without requiring an annoying changing of film.

With the benefit of carefree, seemingly unlimited photography comes the challenge of editing, organizing and storing digital images. Referred to as the "workflow", for every filled memory card of digital imagery, hundreds of digital images must be retouched and edited including cropped and adjusted for contrast, exposure, saturation, and the like. Further, the images must be properly named and stored in appropriate locations in fixed storage. After only a few digital photography sessions, it will be readily apparent how the context of if not the entirety of an image can be lost upon the photographer and those with whom the photographer otherwise would share the image.

Modern digital photography tools provide image editing functionality, and image classification and storage functionality. Edits to images can be applied permanently to an image subject to processing, or the edits can be stored separately from the original image so as to provide a pathway to retrieve the originally acquired image. In either case, the edits can include the definition or editing of meta-information such as the time and date of acquiring a corresponding image, the photographic settings of an image acquisition device like a camera having acquired the image, and a size of the image.

Even still, despite the modest functionality afforded by digital photography tools, maintaining context and relevant information pertaining to an image can become a much greater challenge when the image is published to different individuals over a computer communications network and subsequently stored. In this circumstance, in the absence of a sophisticated digital image editor, the meta-information will have been lost. Even to the original photographer, unless an edited image is loaded into the image editor processing the meta-information, the meta-information will have been lost—particularly where the image is viewed through a generic viewer such as a Web browser.

BRIEF SUMMARY OF THE INVENTION

Embodiments of the present invention address deficiencies of the art in respect to image storage and retrieval and provide a novel and non-obvious method, system and computer program product for image annotation for image auxiliary information storage and retrieval. In an embodiment of the invention, a method for image annotation for image auxiliary information storage and retrieval is provided. The method includes loading a digital image into memory of a computer and selecting separately stored auxiliary information for the digital image. A network location of the auxiliary information can be encoded. Finally, the encoding can be embedded into the digital image.

In another embodiment of the invention, a image data processing system can be provided. The system can include a host computer with at least one processor and memory and an image editing tool executing in the memory of the host computer. An image annotation module can be coupled to the image editing tool. The module can include program code enabled upon execution by the host computer to select auxiliary information for a digital image loaded in the image editing tool, to encode a network location of the auxiliary information, for instance in a bar code, and to direct the image editing tool to embed the encoding into the digital image. In this regard, in one aspect of the embodiment, the auxiliary information can include a digital video for the digital image. In another aspect of the embodiment, the auxiliary information can include digital audio for the digital image. In yet another aspect of the embodiment, the auxiliary information can include text for the digital image.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 3 is a schematic illustration of an image data processing system configured for image annotation for image auxiliary information storage and retrieval; and, FIGS. 4A and 4B, taken together, are a flow chart illustrating a process for image annotation for image auxiliary information storage and retrieval.

DETAILED DESCRIPTION OF THE INVENTION

Embodiments of the invention provide for image annotation for image auxiliary information storage and retrieval. In accordance with an embodiment of the invention, auxiliary information can be generated in relation to a digital image. The auxiliary information can include text for the digital image, a digital audio recording for the digital image, a digital video for the digital image, a network reference to other digital images for the digital image, or any combination thereof. A record for the auxiliary information can be generated to include a network location for the auxiliary information and a description of the auxiliary information. Thereafter, the record can be encoded and embedded into the digital image. The digital image with embedded encoded record can be distributed over a computer communications network such that the decoding by a recipient of a copy of the digital image with embedded encoded record can provide the recipient with a network address from which the auxiliary information to the digital image can be retrieved and accessed.

Figure 1:
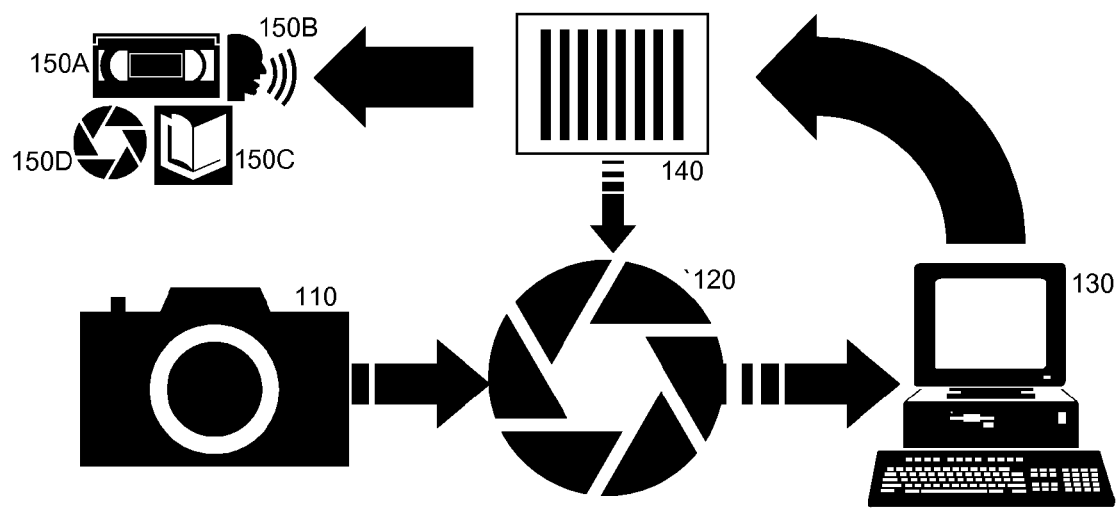
FIG. 1 is a pictorial illustration of a process for image annotation for image auxiliary information storage and retrieval.

In further illustration, FIG. 1 is pictorially shows a process for image annotation for image auxiliary information storage and retrieval. Specifically, an image capture device 110 such as a digital camera or an optical scanner can capture a digital image 120. Auxiliary information 150A, 150B, 150C, 150D, for example digital video 150A, digital audio 150B, text 150C or additional digital imagery 150D can be associated with the digital image 120 in a record of the auxiliary information 150A, 150B, 150C, 150D. The record of the auxiliary information 150A, 150B, 150C, 150D can be encoded into encoding 140, for instance a two-dimensional or three-dimensional bar code and embedded into the digital image 120 through the use of an image storage and retrieval data processing system 130.

Figure 2:
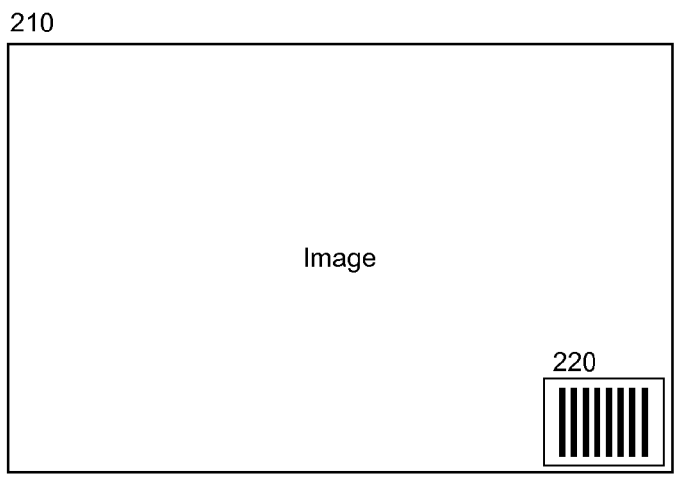
FIG. 2 is a pictorial illustration of a digital image annotated in accordance with a process for image annotation for image auxiliary information storage and retrieval.

As shown in FIG. 2, a bar code 220 form of the encoding can be embedded into the digital image 210 in a non-intrusive manner such that the scanning of the bar code 220 embedded into the digital image 210, including a physical print of the digital image 210, and subsequent decoding of the bar code 220 can produce the record of auxiliary information for the digital image 210 including a network location from which the auxiliary information can be retrieved, and optionally from which the digital image 210 itself can be retrieved. In this way, only the digital image 210 need be published while maintaining an ability of a recipient of the digital image 210, even in print form, can retrieve the auxiliary information to the digital image 210.

The process described in connection with FIG. 1 can be embodied within an image data processing system. In yet further illustration, FIG. 3 schematically shows an image data processing system configured for image annotation for image auxiliary information storage and retrieval. The system can include a host computer 330 with at least one processor and memory hosting the execution of an image editing tool 310 configured to apply edits to digital imagery and to embed additional images into digital imagery. The host computer 330 can be coupled over computer communications network 340 to a remote server 380 managing access to a data store 390 of image annotations. The data store 390 can include auxiliary information 390B for different digital images 390A, such as audio, video or text supplemental to a corresponding one of the digital images.

For example, the auxiliary information 390B for a corresponding one of the digital images 390A can include audio commentary providing context to the corresponding one of the digital images 390A. The auxiliary information 390B also can include video imagery temporally contemporaneous to the acquisition of the corresponding one of the digital images 390A. As yet another example, the auxiliary information 390B can include text that provides context for the corresponding one of the digital images 390A such as a textual statement of the location of the subject of the corresponding one of the digital images 390A, or particular camera settings for a digital camera acquiring the corresponding one of the digital images 390A, or perhaps an identity of the photographer acquiring the corresponding one of the digital images 390A. As even yet another example, the auxiliary information 390B can include text providing classification and categorization information in respect to the corresponding one of the digital imagery 390A.

Of note, the host computer 330 further can include image annotation module 320. The image annotation module 320 can include program code configured upon execution by the host computer 330 to encode a record of the auxiliary information 390 for a corresponding one of the digital images 390A and to embed the encoding onto the corresponding one of the digital images 390A, for example through the use of the image editing tool 310. Importantly, the encoding can include a network location of the auxiliary information 390B in the data store 390. In this way, a decoding of the encoding by scanner 370 in a client computer 350 can produce the location of auxiliary information 390B of a corresponding one of the digital images 390A so that the auxiliary information 390B can be retrieved from the data store 390 over the network 340 and rendered in a content viewer 360 in connection with the corresponding one of the digital images 390A.

FIG. 4A provides a flow chart illustrating a process for image annotation for image auxiliary information storage and retrieval. Beginning in block 400, a digital image can be loaded into memory for editing. In block 410, auxiliary information for the digital image can be selected as an annotation to the digital image. In block 420, a record can be created for the auxiliary information, such as a textual description of the auxiliary information. In block 430, a network location can be established in the record in where the auxiliary information has been stored (and optionally also a copy of the digital image) and from where the auxiliary information (and optionally also the copy of the digital image) can be retrieved. Thereafter, in block 440, the record can be encoded, for instance into a bar code and in block 450 the encoding can be embedded into the digital image.

Turning now to FIG. 4B, a process is described for retrieving auxiliary data for a digital image from an encoding embedded in the digital image. Beginning in block 460, an encoding embedded in a digital image can be scanned, for instance from a print form of the digital image. The scanned encoding can be decoded in block 470 to produce a record including, for instance, a textual description of auxiliary information for the digital image and a location from which the auxiliary information can be retrieved. Thereafter, in block 480 the auxiliary information can be retrieved from the location and displayed in block 490.

As will be appreciated by one skilled in the art, aspects of the present invention may be embodied as a system, method or computer program product. Accordingly, aspects of the present invention may take the form of an entirely hardware embodiment, an entirely software embodiment, including firmware, resident software, micro-code, and the like, or an embodiment combining software and hardware aspects that may all generally be referred to herein as a "circuit," "module" or "system." Furthermore, aspects of the present invention may take the form of a computer program product embodied in one or more non-transitory computer readable storage mediums having computer readable program code embodied thereon such that when the program code is loaded into memory of a computer and executed by one or more processors thereby, the methods described herein can be performed by the computer.

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function or functions.

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for image annotation for image auxiliary information storage and retrieval comprising:
    storing a digital image into memory of a computer;
    selecting separately stored auxiliary information for the digital image;
    encoding a network location of the auxiliary information; and,
    embedding the encoding into the digital image;
    wherein the stored auxiliary information includes audio commentary providing context to the digital image, video imagery temporally contemporaneous to the corresponding digital image, a textual statement of a location of a subject of the digital image, camera settings at a time of acquiring the digital image, identity of a user of a camera at the time of acquiring the digital image, and text providing classification and categorization information with respect to the digital image.

2. The method of claim 1, wherein encoding a network location of the auxiliary information, comprises embedding the bar code into a corner of the digital image.

3. An image data processing system comprising:
    a host computer with at least one processor and memory;
    an image editing tool executing in the memory of the host computer; and,
    an image annotation module coupled to the image editing tool, the module
    comprising program code enabled upon execution by the host computer to select auxiliary information for a digital image loaded in the image editing tool, to encode a network location of the auxiliary information, and to direct the image editing tool to embed the encoding into the digital image;
    wherein the stored auxiliary information includes audio commentary providing context to the digital image, video imagery temporally contemporaneous to the corresponding digital image, a textual statement of a location of a subject of the digital image, camera settings at a time of acquiring the digital image, identity of a user of a camera at the time of acquiring the digital image, and text providing classification and categorization information with respect to the digital image.

4. The system of claim 3, wherein the encoding is a bar code.

5. A computer program product for image annotation for image auxiliary information storage and retrieval, the computer program product comprising:
    a non-transitory computer readable storage medium having computer readable program code embodied therewith, the computer readable program code comprising:
    computer readable program code for storing a digital image into memory of a computer;
    computer readable program code selecting separately stored auxiliary information for the digital image;
    computer readable program code encoding a network location of the auxiliary information; and,
    computer readable program code embedding the encoding into the digital image;
    wherein the stored auxiliary information includes audio commentary providing context to the digital image, video imagery temporally contemporaneous to the corresponding digital image, a textual statement of a location of a subject of the digital image, camera settings at a time of acquiring the digital image, identity of a user of a camera at the time of acquiring the digital image, and text providing classification and categorization information with respect to the digital image.

6. The computer program product of claim 5, wherein the encoding is a bar code.

7. The method of claim 1, further comprising:
    scanning the encoding of the digital image;
    decoding the encoding into the network location;
    retrieving the auxiliary information from the network location;

displaying the auxiliary information including the audio commentary providing context to the digital image, video imagery temporally contemporaneous to the corresponding digital image, a textual statement of a location of a subject of the digital image, camera settings at a time of acquiring the digital image, identity of a user of a camera at the time of acquiring the digital image, and text providing classification and categorization information with respect to the digital image.

8. The system of claim 3, wherein the image annotation module is configured to:
scan the encoding of the digital image;
decode the encoding into the network location;
retrieve the auxiliary information from the network location;
display the auxiliary information including the audio commentary providing context to the digital image, video imagery temporally contemporaneous to the corresponding digital image, a textual statement of a location of a subject of the digital image, camera settings at a time of acquiring the digital image, identity of a user of a camera at the time of acquiring the digital image, and text providing classification and categorization information with respect to the digital image.

9. The computer program product of claim 5, the computer program product comprising:
computer readable program code for scanning the encoding of the digital image;
computer readable program code for decoding the encoding into the network location;
computer readable program code for retrieving the auxiliary information from the network location;
computer readable program code for displaying the auxiliary information including the audio commentary providing context to the digital image, video imagery temporally contemporaneous to the corresponding digital image, a textual statement of a location of a subject of the digital image, camera settings at a time of acquiring the digital image, identity of a user of a camera at the time of acquiring the digital image, and text providing classification and categorization information with respect to the digital image.

* * * * *